May 12, 1925.
A. F. MASURY ET AL
1,537,127
HOUSING FOR RUBBER BLOCK CONNECTIONS
Filed Oct. 12, 1921
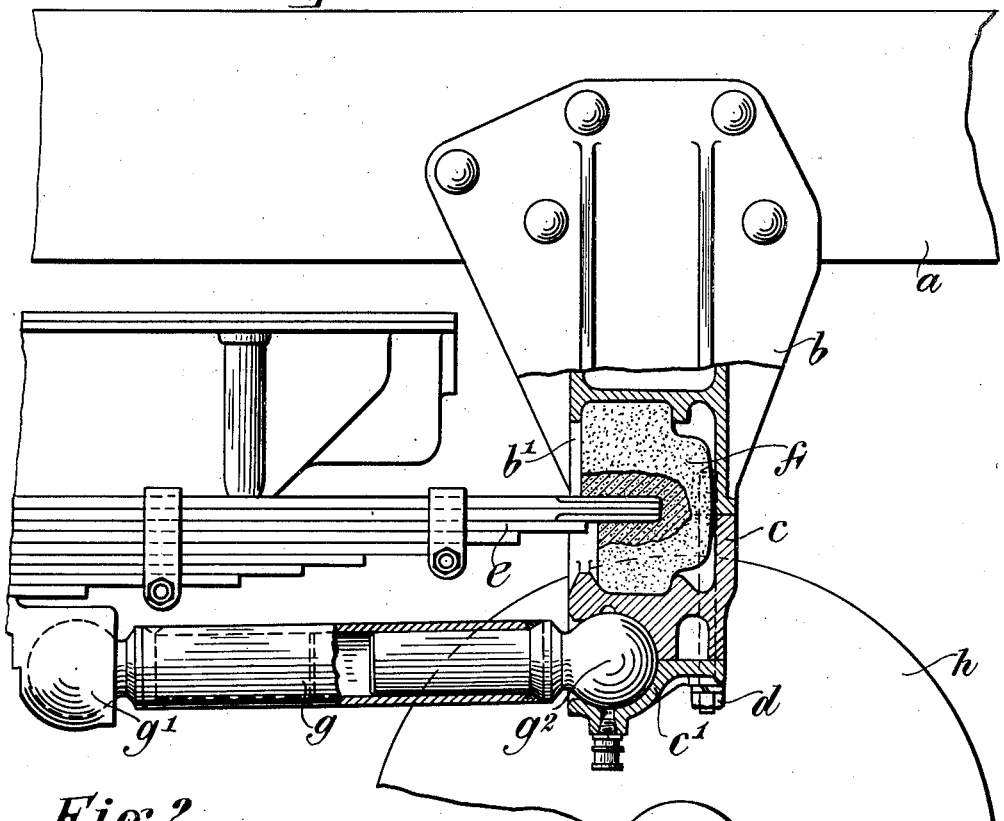
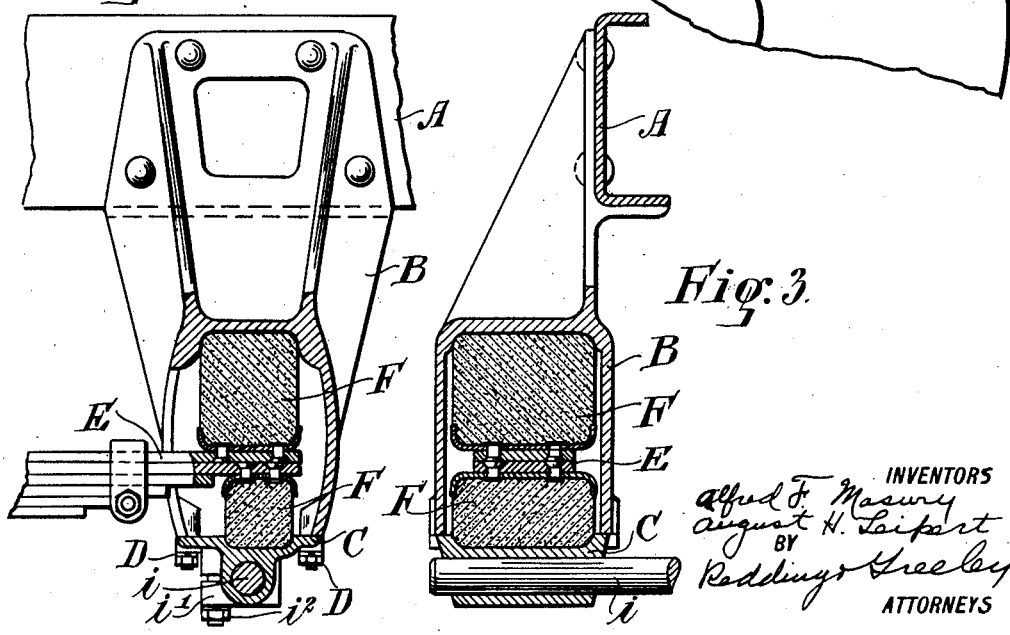

Patented May 12, 1925.

1,537,127

UNITED STATES PATENT OFFICE.

ALFRED F. MASURY, OF NEW YORK, AND AUGUST H. LEIPERT, OF COLLEGE POINT, NEW YORK, ASSIGNORS TO INTERNATIONAL MOTOR COMPANY, OF NEW YORK, N. Y., A CORPORATION OF DELAWARE.

HOUSING FOR RUBBER-BLOCK CONNECTIONS.

Application filed October 12, 1921. Serial No. 507,402.

*To all whom it may concern:*

Be it known that we, ALFRED F. MASURY and AUGUST H. LEIPERT, citizens of the United States, and residing respectively in the borough of Manhattan and in the borough of Queens, of the city of New York, in the State of New York, have invented certain new and useful Improvements in Housings for Rubber-Block Connections, of which the following is a specification, reference being had to the accompanying drawing, forming a part hereof.

In an application for Letters Patent of the United States filed by the present applicants on May 27, 1920, Ser. No. 384,605, there is shown and described an improved yielding connection between metallic elements of a motor vehicle embodied in a rubber block. This connection in one of its important adaptations is provided in place of the usual metallic spring shackle between the vehicle spring and the chassis frame. Since the block in accordance with the invention actually connects the spring with the frame and transmits stresses therebetween, it is a problem to support it in operative relation to the elements connected without employing positive fastenings passing therethrough and through one or both of said elements. This problem is best solved by supporting the block within a separable housing which is fastened to the frame and has an open side through which the spring may extend for engagement with the block. The present invention relates to a housing of this general character, as an improved article of manufacture, which shall be of such construction as to afford in addition operative metallic connections for other usual parts of a motor vehicle, such as radius rods, truss rods, etc. In accordance with the invention one section of the housing is so formed as to receive the element to be connected therewith, this point of connection being so disposed with respect to the rubber block and the element seated therein as not to affect the action thereof in anywise nor to interfere with the ready assembly and disassembly of the units. On the contrary, it is one of the principal objects of the invention to incorporate in a housing of the character described a connection for radius rods, truss rods, etc., which shall afford a more ready connection therefor with the frame than has heretofore been provided.

The features of the invention will appear at greater length hereinafter in connection with the illustrative embodiments thereof shown in the accompanying drawing, wherein—

Figure 1 is a fragmentary view, partly in section and partly in elevation, of the improved housing as applied to a motor vehicle, and showing the connection therewith of a radius rod.

Figure 2 is a detail view, partly in side elevation and partly in section, of an improved housing formed with a connection for a truss rod.

Figure 3 is a view in transverse section through the elements shown in Figure 2.

As pointed out hereinbefore and as appears more fully from the application hereinbefore identified, the improved rubber block connection may be employed in a variety of situations in a motor vehicle although, to date, it has found its most important application when used in place and instead of a metal spring shackle. It is with reference to a block and housing in this situation that the improvements herein are to be described, although it will be understood as the description proceeds that the invention may be incorporated in housings for such rubber blocks wherever located on a motor vehicle. In Figure 1 the frame $a$ is shown as having riveted to the outer side thereof a housing $b$ which is formed with a removable cap $c$ secured to the housing proper by bolts $d$. One side of the housing $b$ and its complementary cap section $c$ is open, as indicated at $b'$, to receive the end of a vehicle spring $e$ which extends into the housing and seats in a rubber block $f$ which is supported within the housing and forms the connection between the spring and the vehicle frame without the use of metal to metal positive fastenings. The present invention relates to the housing $b$ as an article of manufacture and particularly to the incorporation therein of suitable connections for radius rods, truss rods or other elements of a motor vehicle, to the frame. As shown in Figure 1 it is proposed to afford a connection for the radius rod $g$, one end $g'$ of which, it may be assumed, is connected to the axle of the vehicle or to a leading truck (one wheel of which is indicated at $h$) such as is employed in railway motor cars for supporting the front end of the chassis. The invention is not to be limited to the construction or arrangement of the radius rod or other element to be connected to the frame $a$. The other end $g^2$ of the radius rod $g$ is illustrated as formed in the shape of a ball for seating in a socket to afford universal movement. This socket is provided in part in the lower side of the cap $c$ and in part in a complementary sub-cap $c'$ which may be secured in place by the through bolts $d$ which also hold the cap $c$ on to the housing $b$. Removal of the bolts $d$ will release the sub-cap $c'$ for disconnection of the radius rod $g$. Of course, if desired, it is evident that bolts independent of the bolts $d$, which retain the cap $c$, might pass through the sub-cap $c'$ into the cap $c$ to afford an independent connection. It is also evident that since the connection between the housing $b$ and the radius rod $g$ is of metal it may take any form within the range of mechanical expediency.

In Figures 2 and 3 there is shown a somewhat modified construction of housing to afford a connection for transverse truss rods for stiffening the frame of a chassis. In this embodiment the frame A has secured thereto a housing B adapted to be closed by a cap C bolted thereto, as at D, and receiving therein the end of a vehicle spring E, which is supported therein by rubber blocks F. In this form the cap C is adapted to receive a transverse truss rod $i$, which may be clamped in place by a split bearing $i'$ formed with the cap C and adapted to be clamped by a bolt $i^2$. In assembling, the truss rod $i$ may be inserted in its bearing in the cap C before or after the latter is bolted to the housing B. In either event, however, the bolts $i^2$ will preferably not be set up on until after the cap is secured in place.

Other embodiments of the invention will suggest themselves to those skilled in the art but are to be deemed within the scope of the invention provided a housing for the support of yielding connections is adapted, in addition, to afford connections between the frame and other elements of a motor vehicle.

We claim as our invention:

1. As an article of manufacture, a separable housing to retain means comprising a yielding non-metallic connection between a vehicle spring and chassis frame formed with a cap detachably secured thereto, a sub-cap secured to said first named cap and unyielding means carried with the cap and the sub-cap to retain one end of a radius rod of a motor vehicle.

2. As an article of manufacture, a separable housing to retain means comprising a yielding non-metallic connection between a vehicle spring and chassis frame formed with a cap detachably secured thereto, a sub-cap carried with said first named cap, unyielding means carried with the cap and the sub-cap to retain one end of a radius rod of a motor vehicle and means for securing said sub-cap with said last named means detachably to the housing.

3. As an article of manufacture, a housing to retain a yielding non-metallic connecting element between a vehicle spring and the chassis frame of a motor vehicle comprising an upper portion for attachment to the chassis frame formed with a recess to receive said connecting element and an opening at one side to allow for the reception of the end of the vehicle spring, a cap formed detachably therewith to retain said connecting element against displacement, a recess formed in said cap to receive one end of a radius rod, a detachable sub-cap formed with said first named cap to unyieldingly retain said radius rod in said recess and means for securing said sub-cap with said first named cap detachably to the housing.

This specification signed this 10th day of October, 1921.

ALFRED F. MASURY.
AUGUST H. LEIPERT.